(12) United States Patent
Johnson et al.

(10) Patent No.: US 10,316,120 B2
(45) Date of Patent: Jun. 11, 2019

(54) PROCESS AND APPARATUS FOR MANUFACTURE OF PROCESSABLE POLYVINYL ALCOHOL

(71) Applicant: Aquapak Polymer Limited, Birmingham (GB)

(72) Inventors: Anthony Francis Johnson, Leeds (GB); Stephen Sik Fan Wong, Bradford (GB)

(73) Assignee: Aquapak Polymer Limited, Birmingham (GB)

( * ) Notice: Subject to any disclaimer, the term of this patent is extended or adjusted under 35 U.S.C. 154(b) by 0 days.

(21) Appl. No.: 15/268,508

(22) Filed: Sep. 16, 2016

(65) Prior Publication Data

US 2017/0081442 A1 Mar. 23, 2017

(30) Foreign Application Priority Data

Sep. 18, 2015 (GB) .................................. 15185965.9

(51) Int. Cl.
*C08F 116/06* (2006.01)
*C08K 5/053* (2006.01)
(Continued)

(52) U.S. Cl.
CPC .............. *C08F 116/06* (2013.01); *B01J 8/10* (2013.01); *B01J 19/18* (2013.01); *B01J 19/20* (2013.01);
(Continued)

(58) Field of Classification Search
CPC ............... C08L 29/04; C08L 2205/025; C08L 2203/16; C08K 5/053; C08K 5/06;
(Continued)

(56) References Cited

U.S. PATENT DOCUMENTS

| 3,607,812 A | 9/1971 | Takigawa et al. |
| 4,493,807 A * | 1/1985 | Vyvial .................... B29C 47/76 264/101 |
| 2005/0001348 A1 | 1/2005 | Kohnen et al. |

FOREIGN PATENT DOCUMENTS

| EP | 0415357 A2 | 3/1991 |
| JP | 2002254492 A | 9/2002 |

(Continued)

OTHER PUBLICATIONS

KR 2009096766 A, machine translation, KIPO KIPRIS. (Year: 2009).*

(Continued)

*Primary Examiner* — Josephine L Chang
(74) *Attorney, Agent, or Firm* — Young Basile Hanlon & MacFarlane, P.C.

(57) ABSTRACT

The invention describes a method for the manufacture of a plasticized polyvinyl alcohol polymer mixture, the method including the steps of introducing a polyvinyl alcohol polymer with a degree of hydrolysis of at least 98 wt % or a blend of the polyvinyl alcohol polymer into a mixing reactor; reacting a reaction mixture comprising a processing agent, plasticizer and polyvinyl alcohol polymer in a reaction zone to form plasticized polyvinyl alcohol polymer; wherein the processing agent is water, or a mixture of water and one or more $C_1$-$C_4$ alcohols or other hydroxyl compounds wherein the boiling point of the processing agent is less than the boiling point of the plasticizer; wherein the processing agent is from 3 wt % to 18 wt % in the reaction mixture; and allowing the plasticized polyvinyl alcohol polymer mixture to pass from the mixing reactor.

12 Claims, 5 Drawing Sheets

(51) Int. Cl.
*B01J 19/24* (2006.01)
*C08K 5/06* (2006.01)
*C08L 29/04* (2006.01)
*B01J 8/10* (2006.01)
*B01J 19/18* (2006.01)
*B01J 19/20* (2006.01)

(52) U.S. Cl.
CPC .......... *B01J 19/2415* (2013.01); *C08K 5/053* (2013.01); *C08K 5/06* (2013.01); *C08L 29/04* (2013.01); *B01J 2208/0053* (2013.01); *B01J 2208/00061* (2013.01); *B01J 2208/00212* (2013.01); *B01J 2208/00415* (2013.01); *B01J 2219/00063* (2013.01); *B01J 2219/00094* (2013.01); *B01J 2219/00135* (2013.01); *B01J 2219/00159* (2013.01); *B01J 2219/00189* (2013.01); *B01J 2219/182* (2013.01); *B01J 2219/24* (2013.01); *C08L 2203/16* (2013.01); *C08L 2205/025* (2013.01)

(58) Field of Classification Search
CPC ... C08K 3/053; B01J 19/2415; B01J 2219/24; B01J 19/18; B01J 19/20; B01J 8/10; B01J 2208/00061; B01J 2208/00212; B01J 2208/00415; B01J 2208/0053; B01J 2219/00063; B01J 2219/00094; B01J 2219/00135; B01J 2219/00159; B01J 2219/00189; B01J 2219/182; C08F 16/06
USPC .......................................................... 524/377
See application file for complete search history.

(56) References Cited

FOREIGN PATENT DOCUMENTS

| KR | 2009096766 A | * | 9/2009 | ............... C08J 5/18 |
| WO | WO-9309171 A1 | * | 5/1993 | ............... C08J 3/18 |
| WO | 9722658 A1 | | 6/1997 | |

OTHER PUBLICATIONS

International Preliminary Report on Patentability in corresponding application PCT/EP2016/072029, dated Mar. 29, 2018.
International Search Report in corresponding application PCT/EP2016/072029 dated Mar. 2, 2017.

* cited by examiner

PROCESS AND APPARATUS FOR MANUFACTURE OF PROCESSABLE POLYVINYL ALCOHOL

This invention relates to a process for manufacture of polyhydric polymers, particularly polyvinyl alcohol. The invention also relates to apparatus for use in carrying out the method. The invention further relates particularly but not exclusively to a method of manufacture of polyvinyl alcohol pellets in a suitable physical form for processing into film or other extruded products. The invention further relates to a novel processable polyvinyl alcohol composition which may be made using the process.

Polyvinyl alcohol is commonly made by hydrolysis of polyvinyl acetate. The degree of hydrolysis affects the properties of the polymer. Polyvinyl alcohol having a low degree (LD) of hydrolysis, 88% and below, is widely used in industry.

Highly hydrolysed polyvinyl acetate, that is, with a degree of hydrolysis greater than 98%, is a co-polymer which essentially comprises homo-polyvinyl alcohol. This polymer, similar to many carbohydrates, decomposes before its melting point of about 250° C. is reached. This makes melt processing difficult and for this reason the highly hydrolysed polymer is generally processed as an aqueous solution. Partially hydrolysed polyvinyl acetate is readily melt processed. For example, 80% hydrolysed polyvinyl acetate, which is clearly a polyvinyl alcohol co-polymer, can be more readily extruded or converted into film by blow moulding than highly hydrolysed polyvinyl alcohol. Typically, highly hydrolysed polyvinyl alcohol may have a crystallinity of up to about 50% depending on the thermal history of the material.

The significant difference between highly hydrolysed (high degree of hydrolysis, HD) and partially hydrolysed (low degree of hydrolysis, LD) polyvinyl alcohols is the extent and quality of the crystalline order due to the differences in the chain structures. Polyvinyl alcohols with less than 2% non-hydrolysed acetate groups can readily crystallise to form strongly hydrogen bonding crystalline domains. These crystalline domains have a structure which is essentially the same as found in polyethylene. The reason for this may be attributed to the small size of the hydroxyl group. However, because of the hydrogen bonding, the melting point of highly hydrolysed polyvinyl alcohol is about 150° C. higher than that of polyethylene. Polyols have been used as plasticisers, but efficient manufacture of plasticised polyvinyl alcohols with a high degree of hydrolysis is not easy to achieve.

According to a first aspect of the present invention there is provided a method for the manufacture of a plasticised polyvinyl alcohol polymer mixture, the method comprising the steps of:

introducing a polyvinyl alcohol polymer comprising at least 98 wt % polyvinyl alcohol or a blend of the polymer into a mixing reactor;

wherein the mixing reactor comprises a blending chamber having a primary inlet, a primary outlet and at least two inter-engaging components extending between the primary inlet and primary outlet, the components being arranged to apply a shearing force to the polymer while the polymer is conveyed by the components from the inlet through a reaction zone to the outlet;

one or more secondary inlets located downstream from the primary inlet for introducing reactants comprising a processing agent and a plasticiser to the chamber to form a reaction mixture;

wherein the blending chamber comprises a plurality of heated regions arranged so that the mixture is subjected to a controlled temperature profile;

a secondary outlet located between the reaction zone and primary outlet arranged to allow removal of processing agent from the chamber;

reacting a reaction mixture comprising the processing agent, plasticiser and polymer in the reaction zone to form plasticised polymer; wherein when the processing agent is water the amount of water is from 3 wt % to 18 wt %; and allowing the plasticised polymer to pass from the primary outlet.

Use of a reactive mixer in accordance with this invention allows the processing agent and plasticiser to be reacted with the polyvinyl alcohol or blend thereof, followed by removal of all or most of the processing agent from the secondary outlet to give plasticised polyvinyl alcohol or a blend thereof.

The mixing of plasticisers with polyvinyl alcohol can be achieved in a wide variety of reactors including well mixed batch reactors. In such reactors the large reaction exotherm which is associated with the mixing process is readily seen. The reaction mixture temperature can rise by 100-150° C. over that of the starting temperature which means that the temperature of the reaction mixture can exceed that of the degradation temperature of the polyvinyl alcohol if the initial temperature of the mixture is above 100° C. High starting temperatures are desirable to initiate the process and to reach completion quickly. The reaction exotherm is difficult to control in batch processes when the volume of the reactants in the reaction vessel is large relative to the cooling surface area of the reactor. The temperature rise can not only discolour and degrade the polymer but can cause it to carbonise and lead to combustion.

For these reasons, an advantageous embodiment comprises a well-mixed flow reactor. This type of reactor should be configured to control the reaction exotherm. A convenient embodiment is a twin screw extruder reactor in which good mixing pertains together with good cooling capabilities along the length of the barrel. Typically, the extruder should have an L:D greater than 25:1 and preferably 40:1 or greater. The extruder may be fitted with a screw configuration which provides good mixing. There are many different types available commercially but a preferred screw configuration is of the co-rotating closely intermeshing type. The screw elements should provide gentle mixing and materials conveyance at a rate which, together with the selected temperature profile of the barrel allows complete reaction in a controlled manner before the product emerges from the die. The throughput rate should be balanced with the complete removal of the processing aid.

Electrically driven screws may serve to convey the reaction mixture to a die which, in a simple configuration produces a strand which passed directly to a pelletiser. It is convenient to use a conveyor belt to support the strand as it emerges from the die as this can be used to apply drawing forces on the strand. This allows control over the strand diameter. Multiple stand dies can be used, a limit being the ease of handling of the strands and the pelletisation capacity of the pelletiser. It can be advantageous to cool the strand on the conveyor belt and/or in transit from the conveyor belt to the pelletiser. The rate of cutting by the pelletiser can be adjusted and this rate relative to the strand throughput rate can be used to control pellet size.

This configuration is particularly well suited to small-scale manufacture with extruders with barrel diameters of 10-40 mm diameter.

An advantageous embodiment is an extrusion process to manufacture highly hydrolysed PVOH pellets for film blowing. The exothermic reaction may by controlled by altering the screw configuration, if a good product is to be produced from the particular formulation of the PVOH blend, the processing aid and plasticizer.

A further advantageous embodiment is a method for preparing a highly hydrolysed thermoplastic PVOH pellets for film blowing is by melt reactive extrusion that comprises: (1) melting polyvinyl alcohol; (2) breaking down the crystallinity of the polyvinyl alcohol with water; (3) melt blending the polyvinyl alcohol with the plasticizer; (4) removal of the excess water by the vacuum port towards the end of the extruder just before the metering section to produce a bubble free strand of extrudate; (5) extruding through a die; and (6) cooling and pelletizing.

The polyvinyl alcohol may be manufactured by hydrolysis of polyvinyl acetate, wherein the extent of hydrolysis being 98% or greater.

The processing agent may be water. Alternatively, the processing agent may comprise a mixture of water and one or more $C_1$-$C_4$ alcohols or other hydroxyl compounds with a boiling point less than the boiling point or melting point of the plasticiser. Water may be used for cost and environmental reasons.

The amount of water in the reaction mixture may be from 3 wt % to 18 wt %, alternatively 3 wt % to 15 wt %, further alternatively 3 wt % to 12 wt %, further alternatively 5 wt % to 10 wt %.

Plasticisers may be selected from the group consisting of: polyhydric alcohols, polyethylene glycols, glycerol, diols or triols, for example, propylene glycol, ethylene glycol, polyethylene glycol, glycerol, sorbitol (melting point 94-98° C.).

Exemplary plasticisers are mannitol (melting point 164-169° C.), erythritol (melting point 275° C.), pentaerythritol (melting point 198-210° C.), dipentaerythritol (melting point 212° C.-220° C.), trimethylolpropane (melting point 63° C.) and mixtures thereof.

A mixture of pentaerythritol and dipentaerythritol may be employed. Polyhydric alcohols which may be used include alkoxylated derivatives. The extent of alkoxylation may be changed to alter the extent to which the plasticiser hydrogen bonds to the polyvinyl alcohol which in turn influences the effectiveness of the plasticiser as a processing agent. For any given polyhydric alcohol plasticiser, the extent of alkoxylation can be changed from 1 to 99% but is often most effective when within the range of 5%-50%. The alkoxylation of polyhydric alcohols which are liquids at ambient temperature or close to ambient temperature may be particularly advantageous.

Glycerol is an effective plasticiser. It is readily available at a low cost and gives a high energy output in anaerobic digestion waste disposal processes for polyvinyl alcohol. Glycerol is environmentally safe. In the case of a plasticiser which is liquid at ambient temperatures, such as glycerol, the boiling point (295° C.) and vapour pressure at processing temperatures, for example 190-220° C., may be considered because the plasticiser must be contained within the mixing reactor. The mixing reactor may also contain superheated water which may be vented during processing. Loss of glycerol during venting of the water vapour at a secondary reactor outlet may lead to formulation changes and the need for plasticiser recovery, for example using a condenser with an appropriate capacity to deal with the amount of volatiles removed depending on the scale of the reactor used. Glycerol/water mixtures have the disadvantage that they can volatilise from the reactor together during processing.

Exemplary formulations may not contain glycerol.

The processing temperature may have a maximum of about 220° C. and is a function of reactor design, stirring and the containment capabilities of the reactor.

Solid plasticisers with high melting temperatures relative to ambient temperature may be used. Solid plasticisers are frequently volatile at the processing temperatures. Exemplary plasticisers have a melting point in the range of about 150° C. to about 300° C., typically about 150° C. to about 275° C. Solid plasticisers which may be employed include erythritol, pentaerythritol, sorbitol and trimethylolpropane and mixtures thereof, especially mixtures of pentaerythritol and dipentaerythritol, for example comprising 90-95 wt % pentaerythritol and 10-5 wt % dipentaerythritol, especially 93% pentaerythritol and 7% dipentaerythritol.

Exemplary plasticisers have the property of being non-volatile at the processing temperature, so that they remain in the formulation when the important step of processing agent removal is carried out.

For certain applications an amount of 1 wt % to 5 wt % of liquid polyhydric alcohol, for example glycerol, may be used in addition to the solid plasticiser.

Plasticisers and processing agents can be added to the reactor singly or in various combinations. For example, a solution of glycerol or other plasticiser in water or other $C_1$-$C_4$ processing agents may be injected through a single secondary inlet.

A solid plasticiser may be fed into the reactor independently or together with one or more of the polymeric materials of the formulation.

In an advantageous embodiment, the mixing reactor comprises a twin screw extruder with counter-rotating closely intermeshing screws. Alternatively, the mixing reactor may comprise a jacketed batch reactor which may be used for smaller scale processes. The mixing reactor should have a high internal surface area per unit mass of reactants to allow efficient heat dissipation.

The extruder reactor chamber may be composed of 5-20 heated regions, typically 10-15, for example about 12 regions. The temperature profile may increase from ambient temperature at the first region to about 200° C. adjacent the secondary outlets. The reaction zone may have a temperature of at least about 200° C.

The location of the reaction zone is controlled by selection and/or adjustment of one or more of: the following parameters: the screw configuration, the formulation, the temperature profile, rotational speed of the one or more screws (depending on reactor type) and the rate of feed of the reaction mixture into the apparatus. The screw configuration may be important to ensure that any desired reactions are completed within the section or proportion of the length of the extruder barrel. Any selected screw configuration should be effective in the particular size of extruder which is employed. Extruders with a length (L) to barrel diameter (D) ratio, that is L:D, in the range 20:1 to 50:1 or even greater may be employed. To be effective in twin screw extruders with barrel diameters in the range 15 mm to 95 mm or greater a selected configuration may have a significant material conveying capacity relative to intensive mixing or back mixing in elements within the length of the barrel. The intermeshing nature of the conveying screws may provide sufficient mixing capability along a proportion of the length of the screws without introducing too much internal or shear heating of the materials. The reaction exotherm may be significant and very rapid and control of heat removal from the reaction mixture is an important consideration for the overall screw design.

In the case of a 55 mm diameter extruder with an L:D of 48 which is divided into, for example, 12 equal length heated zones from Zone 0 in the vicinity of a primary feed port for feeding solid powdered polymers and solid plasticisers through to Zone 11 immediately prior to the primary outlet of the extruder, closely intermeshing screw elements may be employed from Zone 0 to Zone 5. Intensive paddle mixing screw elements may be employed in Zone 6 followed by further conveying screw elements in Zones 7 and 8. A second intensive mixing Zone may be situated in Zone 9 with further conveying screws in Zones 10 and 11. Control of the very rapid and exothermic reaction as the reaction mixture transitions between a mixture of polyvinyl alcohol, water or other processing agent, and plasticiser when it happens is difficult and is only achieved with the appropriate screw configuration, screw speed and barrel heating and cooling schedule.

The location of the reaction zone may be determined by monitoring the temperature. The temperature sensors may be located at each zone along the length of the reaction vessel. Typically in a reaction zone the temperature may be between 1° C. and 7° C. higher than the set-point temperature for that zone. In an embodiment, the location of the reaction zone when most of the reaction is completed is controlled by appropriate adjustment of the aforementioned parameters so that it is located upstream of the secondary outlet, Zones 5 and 6. The location of the reaction zone may be adjusted so that the reaction is complete prior to venting, that is, when in the first of the venting Zones (7) the reaction mixture may be completely in a viscoelastic state allowing the removal of the processing agent.

Energy may be provided by the shear forces generated within the reaction mixture but this should be small with an exemplary screw configuration compared to the heat which can be introduced or removed through the walls of the reactor by electrical heating bands on the barrel of the extruder and a barrel water cooling system. In a reaction zone, the primary heating source for the reactants may be the reaction exotherm which results in from the chemical energetics of the reaction between the processing agent and hydrogen bonded crystalline domains of the polymer together with the involvement of the plasticiser. Failure to affect adequate temperature control may lead to chemical reactions involving the primary chemical bonds rather than secondary hydrogen bonds in each of the reactants. This may lead to decomposition of the polymer, generation of brown colouration in the product and even violent carbonisation of the polymer mixture within the extruder when the temperature may rise to the point where combustion can take place.

In an exemplary embodiment, the configuration of the screws, typically co-rotating closely intermeshing twin screws of a twin screw extruder, has been disclosed above. The specific configuration of the screw design might vary when using extruder reactors manufactured by different companies but in exemplary systems which may be employed a conveying section is provided at the throat or inlet of the extruder in Zone 0 which is maintained at a temperature close to ambient, to progress the solid powders forming part of the reaction mixture. The feed rate of the ingredients should be regulated so that the throat is not overfed. When a primary recyclate is also added to the formulation the same solids feed port can be used but the conveying screw type employed in the zone should be capable of conveying both the hard thermoplastic recyclate and the virgin powders. The liquid processing agent and any liquid plasticiser that is used may be fed downstream of the solids feed port in Zone 0. The temperature of the conveying sections in Zones 1 to 5, may be increased in a way to ensure good mixing of the reactants is affected and that a reaction starts to form a viscous slurry which gives rise to a fast exothermic transformation to a fully viscoelastic melt state in Zone 5. When all the processing variables have been appropriately controlled the reaction can start in Zones 2-4 at the interface between the flights of the co-rotating screws but only reaches a rapid rate which propagates through the entire reaction mixture in Zone 5.

The intensive mixing screws employed in Zone 6 may ensure that the desired reaction goes essentially to completion in that zone. There may be a pressure drop in Zones 7 and 8 which are fitted with conveying screws and the zones may be only partially full of material. This allows one or more of these zones to be fitted with vent ports provided with stuffer valves to ensure there is no loss of solid materials but arranged so that most of the processing agent is removed. The latent heat of volatilisation as the processing agent is removed may be an important part of the cooling mechanism at this stage to ensure that the viscoelastic polymer does not overheat. The intensive mixing zones of the screws fitted in Zone 9 may ensure that any remaining unreacted polymer is converted to a desired viscoelastic state. Paddle mixers may also act a seal allowing vacuum assistance to be applied to the stuffer vent ports located in both Zones 7 and 10. The latter may be fitted to provide that the water content of the reaction mixture is typically between about 0.05 and about 0.5% on exiting the primary outlet. The screw elements fitted in Zones 10 and 11 may allow further mixing, conveying, venting and compression of the melt through the secondary outlet either to a die or to another pumping system for the melt.

In an embodiment having 12 temperature zones, the zones may have the following exemplary zone averaged set temperatures:—

| | |
|---|---|
| Zone 0 | 20° C. |
| Zone 1 | 40° C. |
| Zone 2 | 80° C. |
| Zone 3 | 90° C. |
| Zone 4 | 150° C. |
| Zone 5 | 170° C. |
| Zones 6-11. | 200° C. |

The actual set temperatures employed may vary somewhat depending on the size of the extruder barrels. In the range 15-95 mm and extruders with a larger barrel diameter, each zone temperature shown may vary by 5-20° C. or greater.

The method may further comprise an intensive mixing region located downstream of the reaction zone.

In an embodiment, the intensive mixing region may comprise a paddle mixer located between the reaction zone and the secondary outlet. The mixing region may be a kneading region comprising one or more pairs of inter-engaging rotor blades or paddles.

The secondary outlet may be a vent configured to permit removal of processing agent from the mixing reactor.

A twin-screw extruder reactor can be fitted directly with a variety of different dies for pellet manufacture. For a small extruder with barrel diameters of <35 mm or when output rate requirements are relatively low, for example 1-20 kg per hour, simple strand dies with 1-5 holes are suitable, with the number of strands being limited by the ease of handling. Air cooling of the strands may be employed. This is important as polyvinyl alcohol is too hydrophilic for the use of a conventional water bath. Air cooling can involve the use of a forced air cooler or simply length of strand employed prior to pelletisation by any readily available pelletisation device. A conveyor belt is a suitable means of collecting and applying tension to the strands prior to pelletisation in order to control strand diameter. The drawing of the strands may be necessary to overcome the die swell which can be between 10% and 60% depending on formulation type, pressure drop between the extruder and the die and materials throughput rate.

For large twin-screw extruders with which multi-holed dies may be employed, an air-cooled dry face cutter may be employed.

An advantageous attachment at a secondary outlet of a twin screw reactor is a metering system for the smooth delivery of the formulated viscoelastic polyvinyl alcohol product to a pelletisation device. This can be a simple strand cutter or a dry face pelletiser. An exemplary metering pump is a single screw extruder fitted orthogonally or at another convenient angle other than 90° to the secondary outlet of the extruder reactor but any other pump capable of handling a hot viscoelastic polymer quantitatively may be used, for example, a gear pump.

A single screw extruder, when employed may have the appropriate physical dimensions and throughput capabilities needed to match the physical dimensions of the extruder reactor and its throughput capabilities. The mechanical structure or box linking the two extruders may have one or more of the following properties.
  (i) As small a dead volume as possible.
  (ii) A port to allow venting either with or without a stuffer valve being fitted and either with or without vacuum assistance.
  (iii) Mixing within the junction volume should also be good. This can be achieved most readily by extending the screw elements in Zone 12 of the extruder reactor described above into the volume within the link box structure but without touching the screw of the single screw extruder.
  (iv) The structure of the mechanical device used to couple the two extruders should be capable of being heated and cooled in a controlled way when the extruder system is large, that is, when the twin screw reactor barrels are >50 mm in diameter.

Provided that the single screw extruder has the required advantageous features, the single screw extruder itself can be of a standard type with an electrically heated barrel capable of achieving temperatures similar to those in Zone 12 of the exemplary twin screw system. The single screw extruder may provide some additional reaction time but little further mixing. As a primary purpose is to convey the viscoelastic reacted product to a die for cutting in a quantitative manner. Conventional screw design which provides for increasing forward movement of the material and increasing melt pressure up to the die may be adequate. The only significant requirement may be that the screw is appropriately designed in the vicinity of the junction between the two extruders. At that juncture it may be necessary that:
  (i) The viscoelastic melt is transferred without hindrance to the flight of the single screw which has to convey the material along the screw at a rate which should allow venting at the junction to take place.
  (ii) The screw design at the junction between the two extruders should not create any stagnant regions.

The mixing reactors should be self-cleaning in and after use. The specified twin screw elements disclosed herein are particularly suitable for self-cleaning. A single screw extruder is not self-cleaning, nor is the junction zone between the two extruders. Conventional cleaning of extruder systems is to use a purge material after use which will also allow easy start-up the subsequent time the system is used.

Experience has shown that conventional purging of the exemplary reactor configuration may not be effective because:
  (i) Conventional purge materials whether they contain an abrasive additive or not do not clean because they are commonly formulated using a hydrophobic polymer such as polyethylene. The hydrophobic materials may be incapable of removing the hydrophilic polymer from walls and crevices in the system. This problem may be exacerbated by the significant difference in melting points of the purge and product materials, the latter being substantially higher than the former.
  (ii) The exemplary purge material may be another biodegradable material because of the environmental credentials required for polyvinyl alcohol materials Experience has shown that making purge materials from polyvinyl alcohol or other biodegradable polymers is difficult or that they are ineffective when used.

For this reason, inventive protocols have been developed for the speedy cleaning, start-up and shut down of the exemplary reactor system.

For start-up, a completely empty and clean twin and single screw extruder barrels is the optimum starting point. With the twin-screw system decoupled from the single screw system and the single screw extruder from the die and with the junction unit attached to the single screw extruder, all being clean and empty, and the extruder barrel is heated to the selected barrel temperature profile. Supplies of the powder feeds of the polymers (and solid plasticiser when that is used) are started, followed by the water or processing agent (and liquid plasticiser when that is used) either simultaneously or successively. The initial feed rates and screw rotation speeds of the twin screw extruder are lower than the steady state speeds used when at production rates, for example, 50% of full rate and between 100 and 150 rpm, respectively. The feeds are continued until the viscoelastic product emerges steadily from the extruder.

When the polymer emerging from the extruder is flowing smoothly, the two extruders are coupled quickly, the single screw extruder having already been heated to the desired operating temperature for the formulation being used and the screw speed selected to match that required to match the materials feed rates to the twin screw extruder. The joining of the extruders may be facilitated by one of the following:
  (i) The two extruders being linked by a hinged joint so that connection can be made by simply swinging the single screw extruder into place, the final connection being made using a snap-action joining mechanisms or conventional bolts.
  (ii) The single screw system may be mounted on one or more rails so that it can be wheeled directly into place with the final mechanical links being arranged as described in (i) above.

When the viscoelastic polymer emerges from the single screw extruder smoothly and at a steady rate, the multi-holed die which has been heated to the selected temperature is quickly fitted to the secondary outlet of the single screw extruder. The die may be either hinged to the extruder or mounted on a rail system for ease of accurate movement. The die may be secured in place manually.

When multiple strands of polymer emerge independently and smoothly from all the die holes, the dry face cutter unit together with cooling cabinet and drive motor are quickly mounted. This process which may be facilitated by the cutter unit being mounted on a rail system so that it can be rapidly moved into place and mechanically secured. The cutter blades may be started immediately and pellets produced. When the cutter is operating at the correct speed pellets of an appropriate size are produced. The pellets may be pneumatically transported to an appropriate storage tank from which they can be quantitatively dispensed into bags or containers in the usual way. Cooling of the pellets may be carried out as they are transported to the storage container or tank and/or subsequently when within the container or tank.

Once the starting up protocol has been completed and the system is at steady state but at low throughput rates, it is a routine matter for a skilled operator to increase the materials throughput rate to the economic production rate.

In order to provide a clean extruder for a subsequent start-up after a production run, it is generally necessary to adopt a specific protocol to get all the elements of the exemplary complex system to a clean state again. Simple flushing of the extruder with a conventional purge is not effective. A protocol which may be effective is as follows:
  (i) A first step is to retain the temperature profiles for both the twin and single screw extruder and to stop all feeds.
  (ii) The dry face cutter may be quickly removed and subsequently cleaned manually with the blades being checked for wear.
  (iii) The die may be quickly removed and after cleaning away any superficial polymer, placed in an autoclave at 300-450° C. until the polymer has been reduced to an ash which can be blown from the die and die holes.
  (iv) The single screw extruder may be then quickly decoupled from the twin screw reactor and as much polymer as possible is allowed to be pumped out of the system before removing the screw from the extruder. There are two options for removing any residual polymer adhering to the screw; (a) while the screw is slowly pulled from the barrel (or lifted in the case of a clam shell extruder), the hot polymer is pulled cleanly away from the screw as a continuous helical coil, or (b) the screw can be allowed to cool after being pulled from the extruder and allowed to fully cool allowing the polymer to crystallize and become brittle. The cold polymer can then be broken away cleanly from the screw mechanically. In either case, the barrel is mechanically cleaned with a standard cleaning rod while still hot.
  (v) Once decoupled from the twin screw extruder, any polymer remaining in the chamber of the coupling section may be removed mechanically while the chamber itself remains hot.
  (vi) Once decoupled from all attachments, the twin screw extruder may be allowed to cool to 100-110° C. along the length of the barrel and the screw speed reduced to 100 rpm. An exemplary screw configuration may readily eject all remaining polymer, initial as a melt and as the barrels cool, as a crumb which is usually brown in colour because of the long residence time of the material in the barrels. Finally, dry polyvinyl alcohol powder is feed to the extruder in order to scour and clean the screws and the barrels, emerging as a white powder when the cleaning is complete at which point the heating of the barrels can be shut off.

When the shut-down process has been completed, the individual components of the system are ready for start-up.

When water is the processing agent, the water content of the finished plasticised polymer pellets may be less than 5 wt %, alternatively less than 2 wt %, further alternatively less than 0.5 wt %, further alternatively in the range 0.1-0.5 wt %.

Without wishing to be bound by theory regarding the mechanism whereby the reaction mixture is converted from a slurry to a thermoplastic melt, it is believed to be that the molecules of a plasticiser such as glycerol may be slow to break into the crystalline domains of the polyvinyl alcohol used alone. Energy provided by the application of shear forces to control of the temperature of the polymer mixture may allow control of the chemical energetics of the exothermic reaction between the polymer and the processing agent, particularly water which breaks down the crystalline domains of the polymer and at a very fast rate following commencement of the exothermic reaction and high local temperatures which can be achieved. Failure to affect adequate control may lead to degradation and even carbonisation of the polymer.

The rate of rotation of the twin screws may be regulated to control the specific energy per unit length of the reactive mixing chamber per unit mass of reacting material so that the screws serve as energy input devices. It is believed that this mechanically induced flow of energy into the material serves to start the slow breakdown of the crystalline domains in the polymer but is not needed once the reaction takes off in the bulk of the material.

In a typical embodiment, the chamber of the extruder reactor which imparts mixing may be 30%-70% filled with the polymer mixture with the remaining volume being empty or serving as a lower pressure zone to facilitate devolatilisation. The distribution of the reaction mixture along the length of the twin screw extruder barrel may be dependent on screw configuration employed in each of the 12 zones of the exemplary but not limitative reactor system disclosed herein.

The partial filling of a twin screw extruder is generally attributed to a pulsing seen as in material leaving the reactor. A compaction screw set in Zone 12 can be employed to provide a continuous output which is particularly advantageous when the reactor extruder is not coupled to a pump, such as a single screw extruder or another device which serves to damp any pulsation and thus allow more accurate control of pellet dimension, particularly when a dry face cutter is employed for pellet production.

The pump may be located downstream of the primary outlet. The pump may comprise a single screw extruder unit.

In an embodiment, the mixing reactor may be a twin screw extruder and may have a length to diameter ratio in the range 20:1 to 50:1 or greater, alternatively about 25:1 to 45:1, further alternatively about 40:1. For example a typical mixer reactor may have two 95 mm diameter screws with a length of 4.8 meters.

The onset of the exothermic reaction may be controlled by selection of the temperature profile and shear rate applied in the twin screws. The extent of the exothermic reaction may be controlled by the rate of heat removal from the mixer, by the composition and feed rate of the reaction mixture, and by regulation of the shear energy input and location of the reaction zone. The location of the reaction zone at which the exothermic reaction occurs may be controlled by appropriate control of the temperature profile and rate of rotation. The zone in which the reaction takes place may be also a function of the nature of the reactants used and the composition of the formulation employed.

The mean residence time in the mixer may be about 2-10 minutes, for example, and both time and temperature influences the yellowing of polyvinyl alcohol when processed at temperatures approaching the melting point of the polymer. With extruder reactor types designed as disclosed herein, residence time distribution measurements (RTD) using a pulse feed of dye into the reactor have shown that the RTD profile may be essentially a Gaussian modified Poisson distribution with the first emergence of colour appearing from the exemplary reactor configuration in approximately two minutes with the peak of the distribution appearing in approximately 2.5 minutes. The exponential fall in dye intensity takes approximately 9 minutes to become insignificant. This pattern for the RTD is seen in systems of an exemplary type with screw diameters of 20, 25, 30, 55 mm and larger. Use of a poorly designed screw configuration may greatly increase the overall RTD leading to poorer quality product.

The residence time in the reactor may be selected to be sufficient to allow completion of the reaction so that a viscoelastic melt is obtained with a minimum amount of unreacted polyvinyl alcohol.

It is well established that polyvinyl alcohol degrades before the melting point of about 250° C. Thermogravimetric analysis shows that under oxidative conditions degradation of polyvinyl alcohol can be can be rapid well below a processing temperature of 200° C. In advantageous embodiments the breakdown of the crystal structure of the polymer happens rapidly relative to thermal degradation through the appropriate design and control of the overall reactor system.

The reaction mixture or formulation may dictate the properties of the final product and also the settings which may be required for the controlled operation of the pellet manufacturing system and may comprise:

polyvinyl alcohol (degree of hydrolysis at least 98%), 87-92%, alternatively 85%;

plasticiser, 5-20%, alternatively 10%;

water or other processing agent, 3-20%, alternatively 5%.

Optional additions to the formulation are processing aids such as stearates or anti-blocking agents such as chalk, fumed silica and many others of each type. Should these be necessary for specific end-use purposes, these may be used in small amounts in the formulation, typically 0.1-5.0 wt %.

The percentages referred to in this specification may be selected from any of the ranges quoted to total 100%. Percentages or other quantities used in the specification are by weight unless indicated otherwise.

In particular embodiments, the polyvinyl alcohol consists of a blend of two or more polyvinyl alcohol polymers each having a degree of hydrolysis of at least 98%, alternatively one with a relatively high molecular weight and at least one relatively low as molecular weight polyvinyl alcohol. The high molecular weight polymer has a higher molecular weight than the low molecular weight polymer. In an embodiment, the polymer may comprise 80% high molecular weight polyvinyl alcohol and 20% low molecular weight polyvinyl alcohol. The ratio of high to low molecular weight molecular polyvinyl alcohol may be 2:1 to 10:1, alternatively 3:1 to 7:1, further alternatively 6:1 to 4:1, further alternatively about 5:1.

Manufacturers of highly hydrolysed polyvinyl alcohol produce ranges of different molecular weight products. Some typical properties are shown in Table 1.

TABLE 1

Typically polyvinyl alcohol properties

| Molecular weight type | Weight average molecular weight (Mw) range | Number average molecular weight (Mn) range | Dispersity index (DI) (Mw/Mn) | Viscosity (cP) Range* |
|---|---|---|---|---|
| Low | 13-50,000 | 7-23,000 | 1.86-2.2 | 0-6 |
| Medium | 85-124,000 | 44-65,000 | 1.93-1.91 | 23-30 |
| High | 146-186,000 | 70-101,000 | 2.09-1.84 | 45-72 |

*Measured using a 4% solution of polymer in water at 25° C.

The dispersity index (DI=Mw/Mn) of the polymers varies in the Table largely because of the rounding of the molecular weight range figures quoted. The theoretical value should be 2.0 if the polymerisation of vinyl acetate monomer conforms to an ideal free radically initiated polymerisation mechanism. The Mw, Mn and DI are measured by the aqueous gel permeation chromatography (GPC) method (ASTM D6666). For the materials used the GPC measured Mn of the high molecular weight polymers may be in the range of about 60,000 to about 120,000 and the lower molecular weight polymer a number average (Mn) molecular weight may be of about 5000 to about 30,000.

Alternatively the molecular weights may be defined by the solution viscosity of a 4% solution at a known temperature in accordance with conventional polymer manufacture and industrial practice.

The blends of different molecular weight polymers employed may be selected in accordance with the physical properties required in the finished product. This may require use of different molecular weight materials. Use of more than two different molecular weight polymers may be advantageous. The use of a single molecular weight polymer is not precluded.

An air cooling chamber may be located downstream of the die as water baths cannot be employed with polyvinyl alcohol. This may comprise a system of moving rollers located in a controlled atmosphere arranged so that the polymer strands emerging from the die are maintained under appropriate tension as they cool and solidify prior to pelletisation.

According to a second aspect of the present invention there is provided a polyvinyl alcohol polymer composition comprising;

a polyvinyl alcohol polymer or blend thereof having a degree of hydrolysis of 98% or more;

a plasticiser in a range from 6 to 15 wt %, wherein the plasticiser is selected from a group consisting of: polyhydric alcohols, polyethylene glycols, glycerol, diols, triols, and mixtures thereof; and having a water content in the range of 0.1 to 0.5 wt %;

wherein in the polymer is a viscoelastic thermoplastic material.

Exemplary polymers and plasticisers are as disclosed above.

According to a third aspect of the present invention, an apparatus for reactive mixing of a polyvinyl alcohol polymer having a polyvinyl alcohol content of 98 wt % or greater comprising a mixing reactor;

wherein the mixing reactor comprises a blending chamber having a primary inlet, a primary outlet and at least two inter-engaging components extending between the primary inlet and primary outlet, the components being arranged to apply a shearing force to the polymer while the polymer is conveyed by the components from the inlet through a reaction zone to the outlet;

wherein the reactor chamber comprises a plurality of heated regions arranged so that the mixture is subjected to a temperature profile whereby the temperature increases from the inlet to the outlet;

one or more secondary inlets located downstream from the primary inlet for introducing reactants comprising a processing agent and a plasticiser to the chamber to form a reaction mixture;

the temperature profile allowing the processing agent and plasticiser to react with the polymer in the reaction zone to form plasticised polymer.

In an alternative embodiment the apparatus comprises a secondary outlet located between the reaction zone and the primary outlet.

Exemplary apparatus is as disclosed above.

The invention is further described by means of example but not in any limitative sense with reference to the accompanying drawings, of which:

The processing issues relating to control of destrucuring or reactive blending in a twin screw extruder of polyvinyl alcohol of different molecular characteristics, (such as molecular weight and degree of hydrolysis or blends of the same polymer with different characteristics) with processing aids and plasticisers (of the types defined previously) under different processing conditions (such as formulation composition, temperature, degree of mixing and time) can be most readily seen by conducting batch experiments.

The mixing processes give rise to an unexpectedly large and rapid exothermic reaction which, if understood by those skilled in the art of reactive extrusion, can lead to the appropriate design of of the twin screw extruder reactor for continuous manufacture of polyvinyl alcohol pellets suitable for use in other thermoplastics manufacturing processes such a film blowing, injection moulding or profile forming using non-reactive extrusion methods.

The essence of the continuous pellet manufacturing process is to avoid known degradation of the polyvinyl alcohol which occurs at temperatures close to its melting point by producing plasticised pellets at a temperature well below the melting point.

Any batch reactor can be used provided that it is temperature controlled and fitted with a good mixing device fitted with torque measurement and a means of measuring temperature of the reacting mixture. A convenient commercial device for such measurements is the instrumented Brabender Plastogram mixer.

Figure 1:
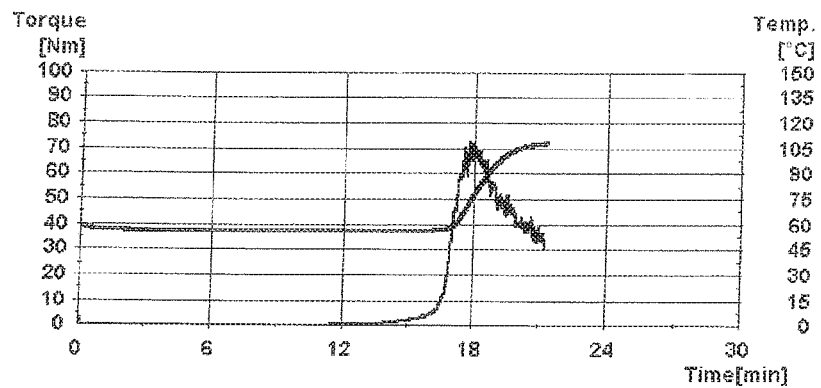
FIG. 1 shows typical torque and temperature changes when polyvinyl alcohol is reacted with a processing aid (water) and glycerine (plasticiser) by reactive mixing in a Brabender batch reactor at ~60° C.

FIG. 1 shows a typical output from a batch mixing process conducted in an instrumented and well mixed reactor using a single highly hydrolysed (>98%) polyvinyl alcohol with water as the processing agent (5%) and glycerin as the plasticiser when the mixing is carried out at a nominal 60° C.

The temperature and torque remain essentially constant for some 12 minutes with the intermeshing stirrer blades running at a constant 100 rpm. The viscosity (as manifest by the torque) is low during the induction period because the slurry formed when the formulation components are first introduced into the pre-heated mixing chamber changes as only slowly and any heat generated is lost to the steel walls of the vessel in the case of the batch reactor employed for the exemplary embodiment. After 12 minutes the viscosity was seen to slowly increase as the processing aid started to cause the polymer to swell. This swelling and mixing process increased rapidly until at 17 minutes there was an almost instantaneous rise in the temperature over a period of seconds which also lead to a very rapid rise in viscosity. After the peak torque was reached, the temperature continued to increase while the torque started to decrease. In a further experiment which was carried out for a longer period, the temperature of the mixture was observed to settle to that of the set point value for the reactor, 60° C. The viscosity behaviour also settled to a steady level, that level being dependent of many factors including the amount of any residual crystallinity in the fluid and also on whether any crystallization also took place as the temperature was lowered.

The rapid exotherm is believed to be the result of a complex series of reactions all involving secondary bonding interactions (primarily hydrogen bonds) between the components of the mixture introduced into the batch reactor. In effect, during the reaction period, a multi-phase slurry is converted to a single phase thermoplastic viscoelastic fluid of high viscosity if all the crystalline domains of the polymer are broken down by the processing aid and plasticiser. In the viscoelastic state, whatever the extent of breaking down of the crystal structure of the polymer (initially ~50%), this has been achieved well below the melting point of the crystalline domains in the polymer (in the case illustrated the maximum temperature reached was 105° C., which is important as the polymer degrades before reaching its melting point by simply applying heat.

Unless the process is carried out in a true calorimetric reactor and the torque measurements can be calibrated, the data generated will always be qualitative. Furthermore, no direct quantitative links can be made between what is measured in a batch reactor and what might occur in a continuous flow twin screw extruder reactor for the same reaction. However, for those skilled in the art of reactive processing, the observations made using an instrumented batch reactors are sufficiently instructuctive to allow the definition of the screw configurations, temperature profiles and feed conditions for effective production of thermoplastic pellets of polyvinyl alcohol in different sized extruder reactors.

Figure 2:
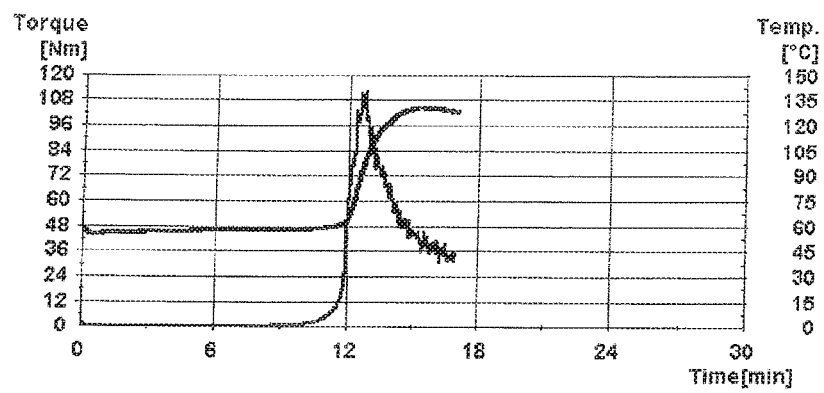
FIG. 2 shows typical torque and temperature changes when polyvinyl alcohol (85%) (comprising different grades) is reacted with water and glycerol by reactive mixing in a Brabender batch reactor.

FIG. 2 shows the sensitivity of the method when all conditions are the same as FIG. 1 but a meld of two different grades of polymer is used. The general pattern of the viscosity and temperature changes are similar but the rapid onset of the phase change to a viscoelstic met from the slurry occurs earlier and both the temperature rise and viscosity levels reached are greater.

Figure 3:
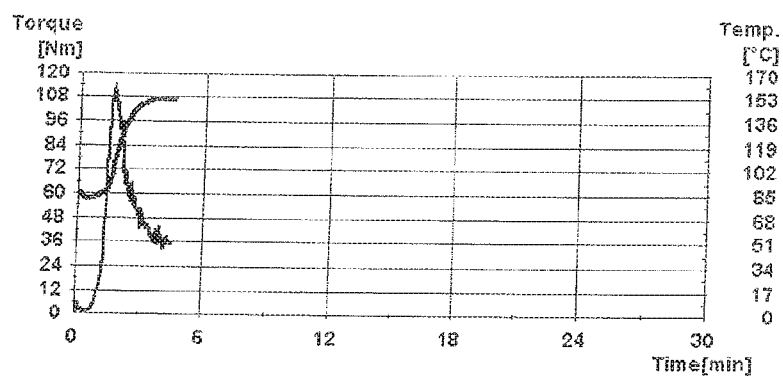
FIG. 3 shows the impact of the initial mixing temperature when polyvinyl alcohol is reacted with a processing aid (water) and glycerine (plasticiser) by reactive mixing in a Brabender batch reactor at 60° C.

FIG. 3 shows the impact of the initial mixing temperature with all other conditions being the same as in FIG. 1. The pattern of change in both viscosity and temperature is similar but occurs much more quickly.

There are a number of different twin screw extruder reactor configurations and sizes which, when the twin screw extruder is fitted with appropriate screws, can produce acceptable pellets for downstream processing, notably film blowing.

Figure 4:
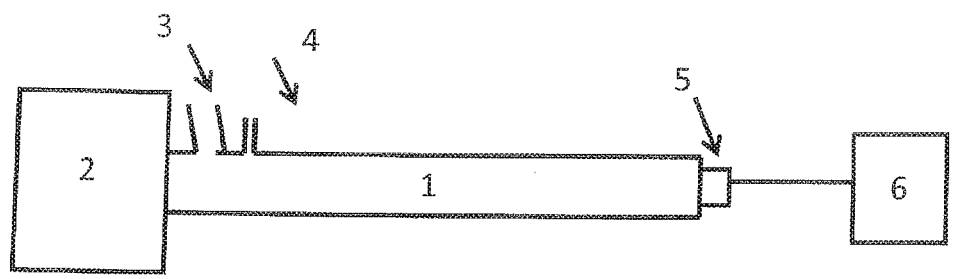
FIG. 4 is a diagrammatic representation of a twin screw extruder system.

FIG. 4 is a diagrammatic representation of a twin screw extruder system. A co-rotating screw extruder (1) is fitted with closely intermeshing screws with a LD ratio greater than 40:1. The barrel is fitted with both heating and cooling apparatus. The screws are driven by an electrical drive motor (2). A solid feed port (3) is located vertically or laterally on the extruder barrel (1). A liquid feed port (4) is located either vertically or laterally downstream of the solid feed port (3). A single or multiple cavity die (5) provides a strand of reacted polymeric material to rotational cutter blades in a pelletiser unit (6). The strand can be conveyed between the die and pelletiser with an electrically driven conveyor belt the speed of which controls the draw ratio of the strand and the diameter of the pellets entering the pelletiser. The rotational speed of the pelletiser blades relative to that of the strand controls the pellet length.

The configuration illustrated is advantageous for smaller extruder reactors with barrel diameters in the range 10-40 mm.

Figure 5:
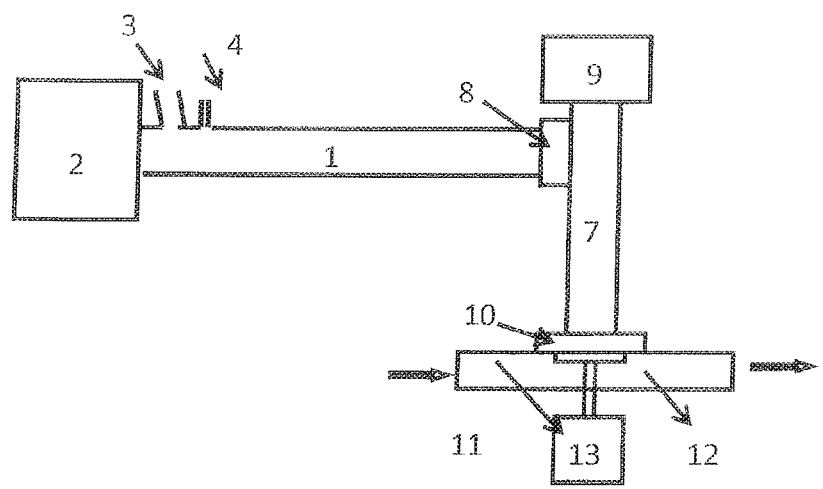
FIG. 5 is a diagrammatic representation of a twin screw extruder coupled to a single screw extruder which is fitted with a multiple cavity die and a dry face pelletiser.

FIG. 5 shows a twin screw system attached to a single screw extruder fitted with a dry faced pelletiser unit. The extruder motor and feed ports to the twin screw extruder reactor are similar to those shown seen in FIG. 4. The single screw extruder (7) or other pump capable is capable of delivering pulseless hot viscoelastic polymer. It is attached as orthogonally to the twin screw extruder via a coupling zone (8) but may be at other convenient angles in the range 95-150°. This section of the system is driven by an electrical motor (9). The single screw extruder (7) delivers the reacted polymer to a multiple cavity die (10) to form multiple strands. The strands are delivered to a pelletiser unit (11) which is fitted with an independently controlled electrical drive unit (13). The cutter blades are located within ducting (12) and close to the die face with a controlled contact pressure. An upwardly directed cooled airflow within the ducting (13), fitted with observation ports, carries pellets away from the cutter unit for collection in a silo for subsequent packing and distribution. The air flow is indicated by the hollow arrows.

Figure 6:
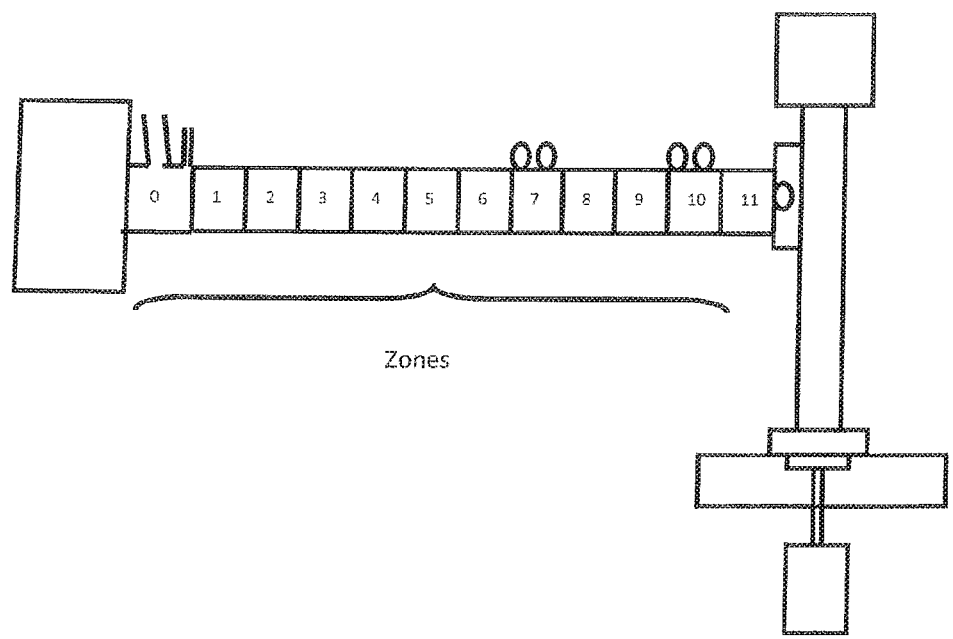
FIG. 6 is a diagrammatic representation of a twin screw extruder with the heating zones highlighted and which is coupled to a single screw extruder fitted with a dry face cutter.

FIG. 6 shows a twin screw extruder coupled to a single screw extruder fitted with a dry face cutter in which all items of the system are the same as that shown in FIG. 5. The heated zones of the twin screw extruder are numbered from 0 to 11. The vented zones are marked with the symbol O.

Zone 1, having a temperature of 100-150° C., alternatively 120° C., is a feed region with a conveyor screw for conveying material to intensive mixing region (2) having a temperature of 120-180° C., alternatively 160° C. Zone 3, having a temperature of 170-220° C., alternatively 190° C., is a reaction region with conveyance screw members either with or without back mixing. Zone 4, having a temperature of 190-220° C., alternatively 200° C., is an intensive mixing region arranged so that reaction goes to at least partial completion. Zone 5 having a temperature of 190-220° C., alternatively 195° C., is a low pressure region with controlled venting to allow removal of volatiles. Zone 6, having a temperature of 190-220° C., alternatively 195° C., is a conveyance region with pumping into either a die or single screw extruder. Where a single screw extruder is used, zone 7, having a temperature of 190-220° C., alternatively 195° C., provides additional residence time for reaction completion and for delivery of materials through a die for pelletisation. Zone 8 comprises the die for which the temperature may be 180-220° C., alternatively 195° C.

The raw materials and finished products were analysed using various techniques, including gel permeation chromatography (GPC), proton nuclear magnetic spectroscopy (pNMR), differential scanning calorimetry (DSC), dynamic thermal analysis (DMA) and other laboratory methods. The defining test for the quality of the pelletized product is the ability to blow film readily from them using standard commercial film blowing equipment. With the pellet manufacturing conditions defined, this last mentioned quality test has been achieved without the introduction of blemishes such as gel, fish eyes, voids and other defects commonly found when pellet manufacture is not effective.

Figure 7:
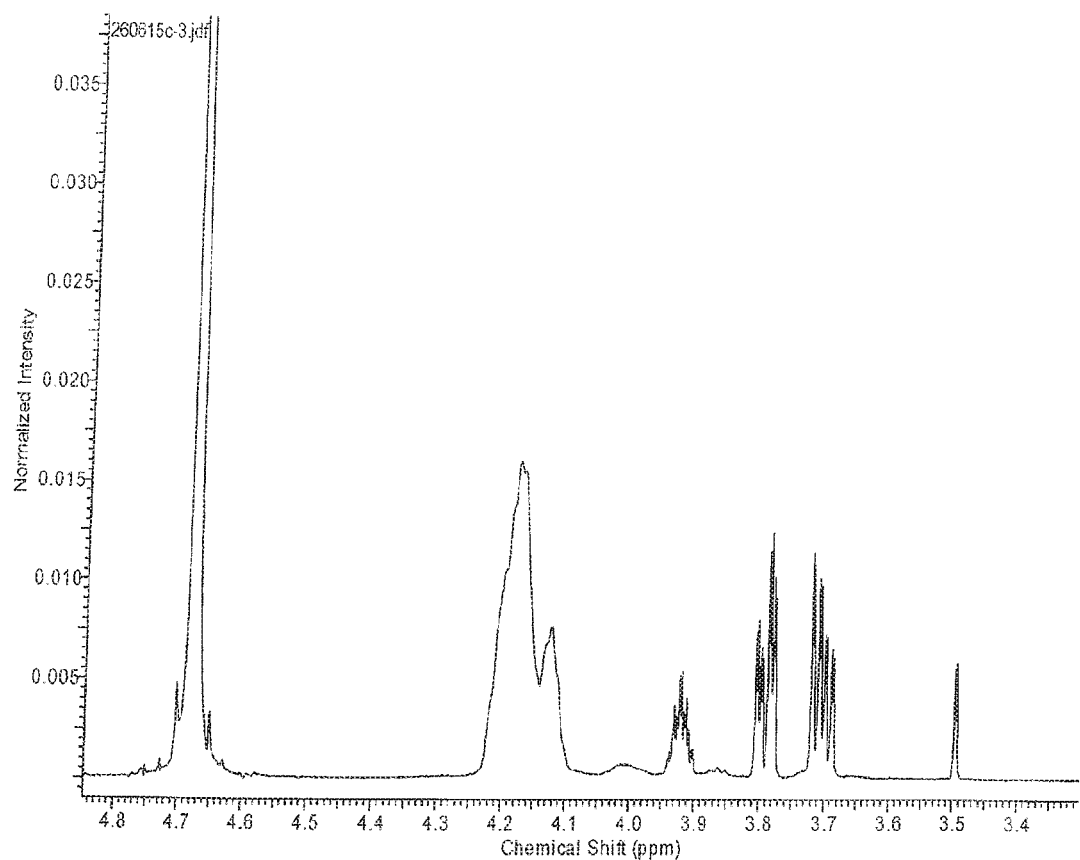
FIG. 7 shows a $^1$HNMR spectrum of the polymer containing 12% glycerol in $D_2O$.

FIG. 7 shows a $^1$HNMR spectrum of the polymer containing 12% glycerol in $D_2O$. NMR spectroscopy was used to check on the copolymer composition of the materials supplied for pellet manufacture and, more importantly, a specific method has been developed to evaluate the amount of plasticiser in both the pellets and finished products made from the pellets.

NMR measurements were typically carried out using a JEOL ECA400 or ECA600 MHz NMR spectrometer with 5 mm broadband tunable solution probe but any suitable instruments may be used. The NMR instrument was calibrated using known concentrations of plasticiser in heavy water, $D_2O$.

Calibration was achieved by making up solutions of glycerol and polymer in $D_2O$ (2%-12% wt/wt) as shown in Table 2. Approximately 10 mg of each was diluted in 1 mL of $D_2O$ and transferred to field matched 5 mm NMR tubes which were heated to 50° C. and locked in the spectrometer with shimming using pulsed field gradients (PFG). $^1$H spectra were acquired for each sample using 8 scans with an increased relaxation delay of 10 seconds (cf. 1 second in a standard experiment) built into the experiment to ensure complete relaxation in order to allow quantitative NMR data to be obtained.

Samples of pellets or finished products (ca. 10 mg) were dissolved in $D_2O$ by heating to 60° C. for 12 hours or until fully dissolved before being submitted to the same analytical procedure as used for calibration standards.

Table 2 is a summary of the solutions employed to calibrate the NMR instrument

| Reference | Calibration Samples |
|---|---|
| GLU010715-001 | 2% glycerol in $D_2O$ |
| GLU010715-002 | 4% glycerol in $D_2O$ |
| GLU010715-003 | 6% glycerol in $D_2O$ |
| GLU010715-004 | 8% glycerol in $D_2O$ |
| GLU010715-005 | 10% glycerol in $D_2O$ |
| GLU010715-006 | 12% glycerol in $D_2O$ |
| GLU010715-007 | Pellet sample |

The CH resonance for glycerol was integrated together with that for the polymer resonance at 4.25 ppm for each of the different concentrations of the solution of the calibration plot. Analysis of pellet and product solutions which were quantitatively prepared in the same way as the calibration standards provided a reliable measurement of glycol (or other) plasticiser content.

Table 3 shows data from peak area integration for the glycerol reference samples and pellet sample.

| Glycerol (%) | Polymer | Glycerol CH | Normalised | Calculated Glycerol (%) |
|---|---|---|---|---|
| 4 | 100 | 3.74 | 0.0374 | 4.40 |
| 6 | 100 | 5.26 | 0.0526 | 6.19 |
| 8 | 100 | 6.98 | 0.0698 | 8.21 |
| 10 | 100 | 8.42 | 0.0842 | 9.91 |
| 12 | 100 | 9.9 | 0.099 | 11.65 |
| Pellet | 100 | 5.85 | 0.0585 | 6.88 |

The amount of the glycerol in the pellet was 6.88 wt % in the case of the example described. The glycerol level in the pellets and finished products influenced the physical properties of the pellets together with the amount of adsorbed water. Typically, the adsorbed water content was in the range 0.1-5.0 wt % in a finished product. This varied with ambient humidity levels. Typically, a film-grade product rapidly achieved an equilibrium water level of ~2.0%. In order to achieve desirable properties in a film-grade product, a glycerol content in the range 6.0-15.0 wt % was required but was alternatively in the range 8.0-10.0 wt %.

NMR was used to establish a pellet formulation and a pellet manufacturing method to achieve optimal properties for downstream controlled manufacture of end products with specific physical properties.

The NMR method employed is not specific for the exemplary plasticiser but is generic for polyhydric materials of the type preferred.

Figure 8:
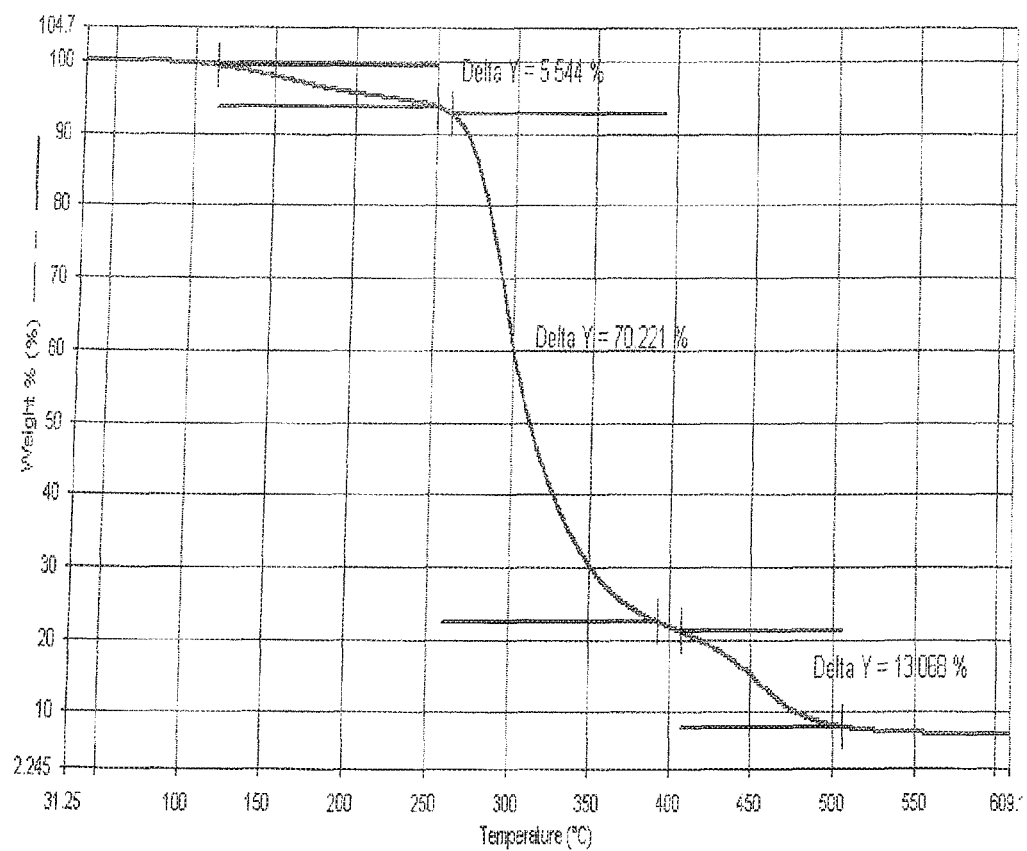
FIG. 8 shows a typical thermogram obtained by thermogravimetric analysis.

The importance of keeping the processing temperature under control can be seen by inspection of the typical thermogram obtained by thermogravimetric analysis of polyvinyl alcohol in air as shown in FIG. 8.

FIG. 8 shows a typical thermogram obtained by thermogravimetric analysis. The thermogram was obtained when examining a pellet manufactured by the method described in Example 1. The weight loss shown was obtained in air. The main features which can be seen in this type of analysis is when water (0.1-5.0%) and a liquid plasticiser is present (~5-15%). The loss of water becomes evident at 100° C. and the slow decomposition and loss of plasticiser at 1800° C. and above. The dramatic loss of plasticiser and decomposition of the polymer with loss of water is very rapid above 210° C. The carbonisation of the polymer commences around 300° C. and the final combustion of the carbonised polymer residue is rapid above 400° C. The thermograms also show any inorganic residues (0.1-4.0%) which might be present resulting from the ingredients used in the polymerisation and hydrolysis processes used to manufacture the polyvinyl alcohols which have been used for pellet manufacture.

EXAMPLES

The following reactive extrusion process was employed.

The melt extruder used in the present extrusion operation was designed to conduct several operations during the preparation of the pellets. The highly hydrolysed polyvinyl alcohol was fed into the initial elements of the extruder. Water and plasticiser were fed to the molten polyvinyl alcohol through a side stream of the extruder (secondary inlet). Water was fed into the liquid feed zone to break down the highly crystalline structure of the as highly hydrolysed polyvinyl alcohol. Formation of hydrogen bonding between the hydroxyl groups of the polyvinyl alcohol with the hydroxyl groups of the plasticiser resulted in a highly exothermic reaction and a rise of temperature of up to 150° C. was recorded in a batch blender (Brabender). The release of this high exotherm was controlled in the twin screw extruder by using the designed screw configuration disclosed above. Water cooling at the reaction zone of the twin screw extruder was also employed to control the heat generated from the exotherm of the hydrogen bonding between the hydroxyl groups of the polyvinyl alcohol and the plasticiser. After melt consolidation of the thermoplastic polyvinyl alcohol blend, a vacuum port was used to remove the water used for breaking down the crystalline structures of the highly hydrolysed polyvinyl alcohol. Optionally, additional polyvinyl alcohol plasticiser can be pumped into the extruder after the vacuum port to make up for any devolatilized polyvinyl alcohol plasticiser during the water removal when a low boiling plasticiser has been used. The resulting reactive melt blend is extruded through a die at the end of the extruder and pelletized with a dry face cutter. Alternatively, the extruded strand was cooled on an air chilled belt and pelletized, Twin screw extruders (Rondol, APV and Zepplin extruders) were set-up to conduct the runs as disclosed in the following Examples. The polyvinyl alcohol blend was fed to the extruder using conventional solid feeder designed to deliver constant flow rates. Water and liquid plasticiser were fed to the extruder as a liquid at a position downstream to the polyvinyl alcohol blend (i.e. at a position further down the barrel of the extruder). The mixture of polyvinyl alcohol blend, water and plasticiser were mixed gently to reduce the risk of overheating due to the high reaction exotherm of the hydrogen bond formation between the polyvinyl alcohol and the hydroxyl groups of the plasticiser. An intensive mixing zone towards the end of the extruder and before the devolatilization zone was utilised to assure the completion of the exothermic reaction. The polyvinyl alcohol mixture was dehydrated by a vacuum port to remove the excess water used to break down the crystallinity of the polyvinyl alcohol. The product was extruded through the die onto an air chilled belt and pelletized.

Example 1

The formulation F9 comprised blends of polyvinyl alcohol (SELVOL EH 6210313 (59.5%), EH 4109645 (25.5%): Sekisui Specialty Chemicals Europe, S.L.) in a series of runs using water (5%) and glycerol (10%). The feed rates to the extruder (Rondol orthogonal system, twin screw 25 mm; L:D 20:1; vented at the junction of the twin and single screw extruder only); gross throughput rate 1.5 kg/hr; die temperature 175° C.; torque generated 60%. The extruder was fitted with a strand pelletiser. The extrusion temperature profile settings were Zone 0, Ambient; Zone 1, 20; Zone 2, 40; Zone 3, 80; Zone 4, 90; Zone 5, 150; Zone 6, 200, Zone 7, 200; Zone 8, 200; Zone 9, 200; Zone 10, 200; Zone 11, 200° C., along the barrel of the extruder. Samples of the pellets produced from these runs were characterised by $^1$H NMR, DSC, GPC and other laboratory methods but the key test was that the pellets produced good film using standard commercial film blowing methods.

Example 2

The formulation K1-010 was used as blends of polyvinyl alcohol (SELVOL EH 6210313 (59.5%), EH 4109645 (25.5%): Sekisui Specialty Chemicals Europe, S.L.) in a series of runs using water (5%) and pentaerythritol (10%). The feed rates to the extruder (Zeppelin RHC 25 twin screw extruder L:D 40:1 vented in Zones 8 and 9); gross throughput rate 10 kg/hr; die temperature 195° C.; torque generated 52+/−2.0%. The extruder was fitted with a strand pelletizer. The extrusion temperature profile settings were Zone 0, Ambient; Zone 1, 20; Zone 2, 40; Zone 3, 80; Zone 4, 90; Zone 5, 150; Zone 6, 200; Zone 7, 200; Zone 8, 200; Zone 9, 200; Zone 10, 200; Zone 11, 200° C., across the barrel of the extruder. Samples of the pellets produced from these runs were characterized as in Example 1 and the pellets produced good film using standard commercial film blowing methods.

Example 3

The formulation L1-010 was used as blends of polyvinyl alcohol (SELVOL EH 6210313 (56%), EH 4109645 (24%): Sekisui Specialty Chemicals Europe, S.L.) in a series of runs using water (10%) and dipentaerythritol (10%). The gross feed rate to the extruder (Zeppelin RHC 25 twin screw extruder L:D 40:1; vented in Zones 8 and 9) 5.0 kg/hr; die temperature 195° C.; torque generated 44+/−4.0%. The extruder was fitted with a strand pelletizer. The extrusion temperature profile settings was Zone 0, Ambient; Zone 1, 20; Zone 2, 40; Zone 3, 80; Zone 4, 90; Zone 5, 150; Zone 6, 200; Zone 7, 200; Zone 8, 200; Zone 9, 200; Zone 10, 200; Zone 11, 200° C. along the barrel of the extruder. Samples of the pellets produced from these runs were characterized as in Example 1 and the pellets produced good film using standard commercial film blowing methods.

Example 4

The formulation M1-010 was used as blends of polyvinyl alcohol (SELVOL EH 6210313 (56%), EH 4109645 (24%): Sekisui Specialty Chemicals Europe, S . . . ) in a series of runs using water (10%) and a mixture of pentaerythritol and dipentaerythritol (10%). The gross feed rate to the extruder (Zeppelin RHC 25 twin screw extruder, L:D=40:1; vented in Zones 8 and 9) 10 kg/hr; die temperature 195° C.; torque generated 55%+/−5.0%. The extruder was fitted with a strand pelletiser. The extrusion temperature profile setting was; Zone 0, Ambient; Zone 1, 20; Zone 2, 40; Zone 3, 80; Zone 4, 90; Zone 5, 150; Zone 6, 200; Zone 7, 200; Zone 8, 200; Zone 9, 200; Zone 10, 200; Zone 11, 200° C., along the barrel of the extruder. Samples of the pellets were produced from these runs as in Example 1 and the pellets produced good film using standard commercial film blowing methods.

Example 5

The formulation F9 was used as blends of polyvinyl alcohol (SELVOL EH 6210313 (%6%), E4109645 (24%): Sekisui Speciality Chemicals Europe, S.L.) in a series of runs using water (5%) and glycerol (10%). The gross feed rate to the extruder (Zeppelin RHC 55 twin screw extruder with L:D=48:1 coupled to a single screw; vented in Zones 7 a, 9 and the junction between the two extruders) was 200 kg/hr; die temperature 195° C.; torque 45%+/1 3.0%. The single screw extruder was fitted with a multiple holed die to which a dry face pelletizer was attached. The extrusion temperature profile settings were Zone 0, Ambient; Zone 1, 20; Zone 2, 40; Zone 3, 80; Zone 4, 90; Zone 5, 150; Zone 6, 200; Zone 7, 200; Zone 8, 220; Zone 9, 220; Zone 10, 230; Zone 11, 210° C. along the barrel of the extruder. Samples of the pellets produced from these runs were characterized as in Example 1 and the pellets produced good film using standard commercial film blowing methods by DSC.

The invention claimed is:

1. A method for the manufacture of a plasticized polyvinyl alcohol polymer mixture, the method comprising the steps of:
    introducing a blend comprising two or more polyvinyl alcohol polymers, each polymer having a degree of hydrolysis of at least 98%, and wherein the blend comprises one high molecular weight polyvinyl alcohol polymer having a molecular weight in the range of about 60,000 to about 120,000 and at least one low molecular weight polyvinyl alcohol polymer having a molecular weight in the range of from about 5,000 to about 30,000 into a mixing reactor;
    wherein the mixing reactor comprises a blending chamber having a primary inlet, a primary outlet and at least two inter-engaging components extending between the primary inlet and primary outlet, the components being arranged to apply a shearing force to the polyvinyl alcohol polymer while the polyvinyl alcohol polymer is conveyed by the components from the inlet through a reaction zone to the outlet;
    one or more secondary inlets located downstream from the primary inlet for introducing reactants comprising a processing agent and a plasticizer, which is pentaerythritol, to the chamber to form a reaction mixture;
    wherein the blending chamber comprises a plurality of heated regions arranged so that the mixture is subjected to a controlled temperature profile;
    a secondary outlet located between the reaction zone and primary outlet arranged to allow removal of processing agent from the chamber;
    reacting a reaction mixture comprising the processing agent, plasticizer and polyvinyl alcohol polymer in the reaction zone to form plasticized polyvinyl alcohol polymer;
    wherein the processing agent is water, or a mixture of water and one or more $C_1$-$C_4$ alcohols or other hydroxyl compounds wherein the boiling point of the processing agent is less than the boiling point of the plasticizer;
    wherein the processing agent is from 3 wt % to 18 wt % in the reaction mixture; and
    allowing the plasticized polyvinyl alcohol polymer mixture to pass from the primary outlet.

2. The method according to claim 1, wherein the ratio of high to low molecular weight polyvinyl alcohol polymer in the polyvinyl alcohol polymer blend is in the range from 2:1 to 10:1, in the range from 3:1 to 7:1, in the range from 4:1 to 6:1, or about 5:1.

3. The method of claim 1, wherein the processing agent is water.

4. The method of claim 1, wherein the amount of processing agent is 3 wt % to 15 wt %, 3 wt % to 12 wt %, or 5 wt % to 10 wt %.

5. The method of claim 4, wherein the processing agent is water.

6. The method according to claim 1, wherein the temperature profile increases from ambient temperature at a first region to 200° C. adjacent the secondary outlets, and wherein the reaction zone has a temperature of at least 200° C.

7. The method according to claim 1, wherein the location of the reaction zone is controlled by changing one or more of: the temperature profile, rotational speed of the one or more screws, and the rate of feed of the reaction mixture into the mixing reactor.

8. The method according to claim 1, comprising an intensive mixing region located downstream of the reaction zone, wherein the intensive mixing region comprises a paddle mixer located between the reaction zone and the secondary outlet.

9. The method according to claim 8, wherein the intensive mixing region comprises a kneading region comprising one or more pairs of inter-engaging rotor blades or paddles.

10. The method according to claim 1, wherein a pump is located downstream of the primary outlet, and wherein the pump comprises a single screw extruder unit.

11. The method according to claim 1, wherein the secondary outlet is a vent configured to permit removal of processing agent from the mixing reactor.

12. The method according to claim 1, wherein the plasticized polyvinyl alcohol polymer has a water content of less than 5 wt %, less than 2 wt %, or less than 0.5 wt %.

* * * * *